(12) United States Patent
Lin

(10) Patent No.: US 6,896,286 B2
(45) Date of Patent: May 24, 2005

(54) STROLLER HAVING A FOLDING DEVICE

(76) Inventor: Wan-Hsing Lin, 58, Ma Yuan West St., Taichung (TW)

(*) Notice: Subject to any disclaimer, the term of this patent is extended or adjusted under 35 U.S.C. 154(b) by 7 days.

(21) Appl. No.: 10/677,794

(22) Filed: Sep. 30, 2003

(65) Prior Publication Data

US 2005/0067813 A1    Mar. 31, 2005

(51) Int. Cl.[7] .............................. B62B 7/00; B62B 1/00
(52) U.S. Cl. ...................... 280/650; 280/642; 280/647; 280/658; 280/47.38
(58) Field of Search .............................. 280/650, 642, 280/645, 647, 651, 652, 657, 658, 47.38, 280/47.41

(56) References Cited

U.S. PATENT DOCUMENTS

| | | | |
|---|---|---|---|
| 5,029,891 A * | 7/1991 | Jacobs ........................ | 280/650 |
| 5,522,614 A * | 6/1996 | Eyman et al. .............. | 280/642 |
| 6,105,998 A * | 8/2000 | Baechler et al. ............ | 280/650 |
| 6,152,476 A * | 11/2000 | Huang ........................ | 280/642 |
| 6,267,405 B1 * | 7/2001 | Chen .......................... | 280/647 |
| 6,299,194 B1 * | 10/2001 | Chen .......................... | 280/642 |
| 6,722,690 B2 * | 4/2004 | Lan ............................. | 280/642 |
| 6,739,616 B2 * | 5/2004 | Lin ............................. | 280/642 |
| 6,767,028 B2 * | 7/2004 | Britton et al. ........... | 280/47.38 |

* cited by examiner

Primary Examiner—Hau Phan
(74) Attorney, Agent, or Firm—Alan D. Kamrath; Nikolai & Mersereau, P.A.

(57) ABSTRACT

A stroller includes a bottom frame, a support frame, a rear frame, two opposite folding devices, a front frame, two pull blocks, and two pull cords. Each of the folding devices includes a main body, a socket, a slide plate, and a locking plate. Thus, the stroller can be extended and folded easily and conveniently, thereby facilitating the user utilizing and folding the stroller. In addition, the stroller can be folded efficiently so as to reduce the volume of the stroller to the minimum value, thereby facilitating package, storage and transportation of the stroller.

15 Claims, 7 Drawing Sheets

STROLLER HAVING A FOLDING DEVICE

BACKGROUND OF THE INVENTION

1. Field of the Invention

The present invention relates to a stroller having a folding device, and more particularly to a stroller that can be extended and folded easily and conveniently, thereby facilitating the user utilizing and folding the stroller.

2. Description of the Related Art

A conventional stroller comprises a folding device, so that the stroller can be folded by the folding device so as to facilitate storage of the conventional stroller. However, the conventional stroller cannot be extended and folded easily and conveniently, thereby causing inconvenience to the user in utilizing and folding the stroller. In addition, the conventional stroller has a complicated structure, thereby increasing costs of fabrication.

SUMMARY OF THE INVENTION

The primary objective of the present invention is to provide a stroller having a folding device.

Another objective of the present invention is to provide a stroller that can be extended and folded easily and conveniently, thereby facilitating the user utilizing and folding the stroller.

A further objective of the present invention is to provide a stroller that can be folded efficiently so as to reduce the volume of the stroller to the minimum value, thereby facilitating package, storage and transportation of the stroller.

A further objective of the present invention is to provide a stroller having a simplified structure, thereby decreasing costs of fabrication.

In accordance with the present invention, there is provided a stroller, comprising:

a bottom frame;

a support frame having a lower portion pivotally mounted on a mediate portion of the bottom frame;

a rear frame having a lower portion pivotally mounted on a rear portion of the bottom frame;

two opposite folding devices each pivotally mounted on an upper portion of the support frame and an upper portion of the rear frame;

a front frame having a lower portion mounted on an upper portion of each of the folding devices;

two pull blocks each movably mounted on the upper portion of the front frame;

two pull cords each mounted in the front frame and each having an upper end secured on the respective pull block to move therewith;

each of the folding devices including a main body, a socket, a slide plate, and a locking plate, wherein:

the main body has a periphery pivotally mounted on the upper portion of the support frame and the upper portion of the rear frame;

the socket is secured in a lower section of the main body and has an inside formed with a receiving chamber having a wall formed with slideway having a bottom formed with a rectangular opening;

the slide plate is movably mounted in the receiving chamber of the socket and has a first section secured on a lower end of the respective pull cord to move therewith and a second section slidably mounted in the slideway of the receiving chamber of the socket, the second section of the slide plate is formed with a locking slot aligning with the opening of the slideway of the socket; and the locking plate is secured on the upper portion of the support frame and is formed with a protruding locking hook extended through the opening of the slideway of the socket and detachably locked in the locking slot of the second section of the slide plate, so that each of the folding devices is fixed on the upper portion of the support frame by the slide plate combining with the locking plate.

Further benefits and advantages of the present invention will become apparent after a careful reading of the detailed description with appropriate reference to the accompanying drawings.

DETAILED DESCRIPTION OF THE INVENTION

Figure 1:
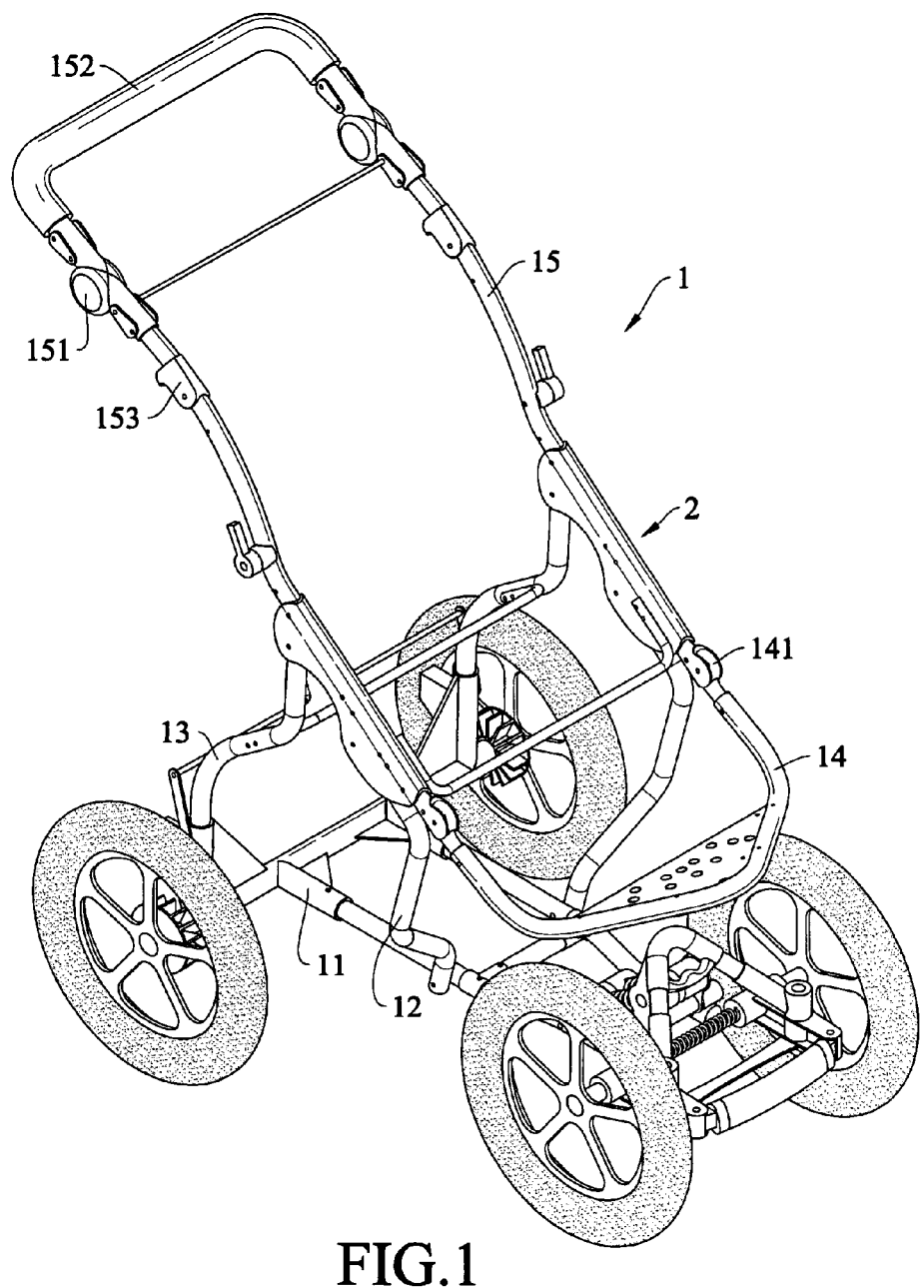
FIG. 1 is a perspective view of a stroller in accordance with the preferred embodiment of the present invention.
Figure 2:
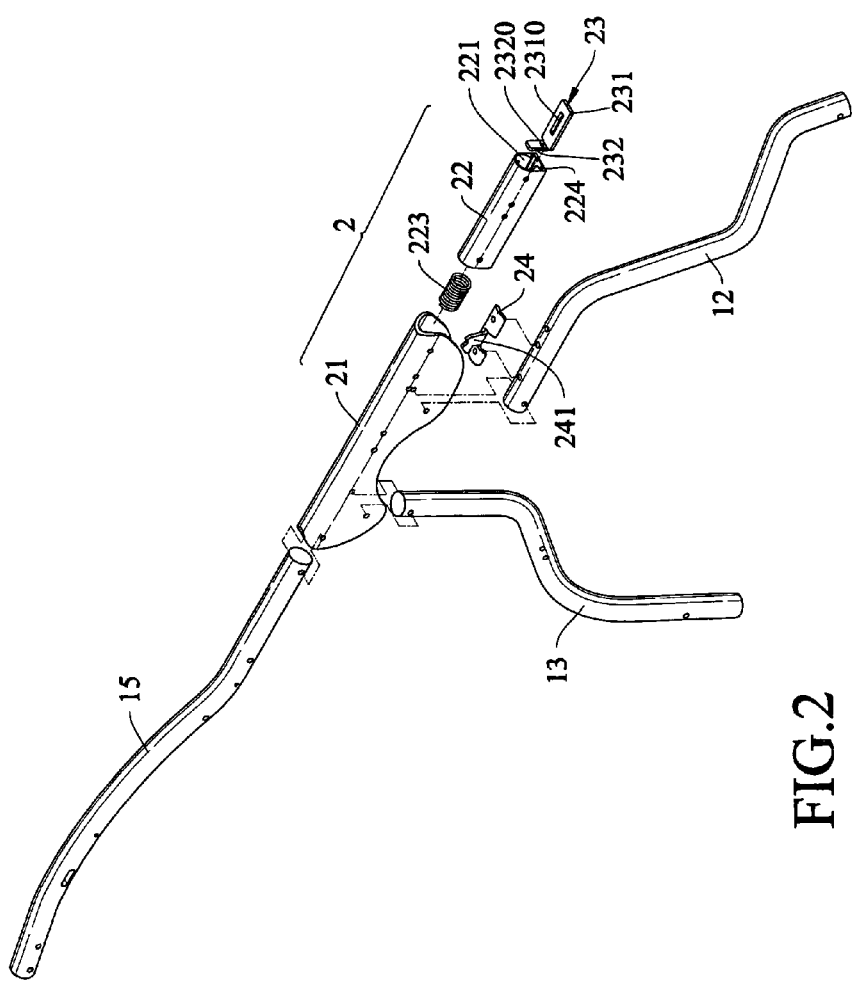
FIG. 2 is a partially exploded perspective view of the stroller as shown in FIG. 1.
Figures 3, 3A:
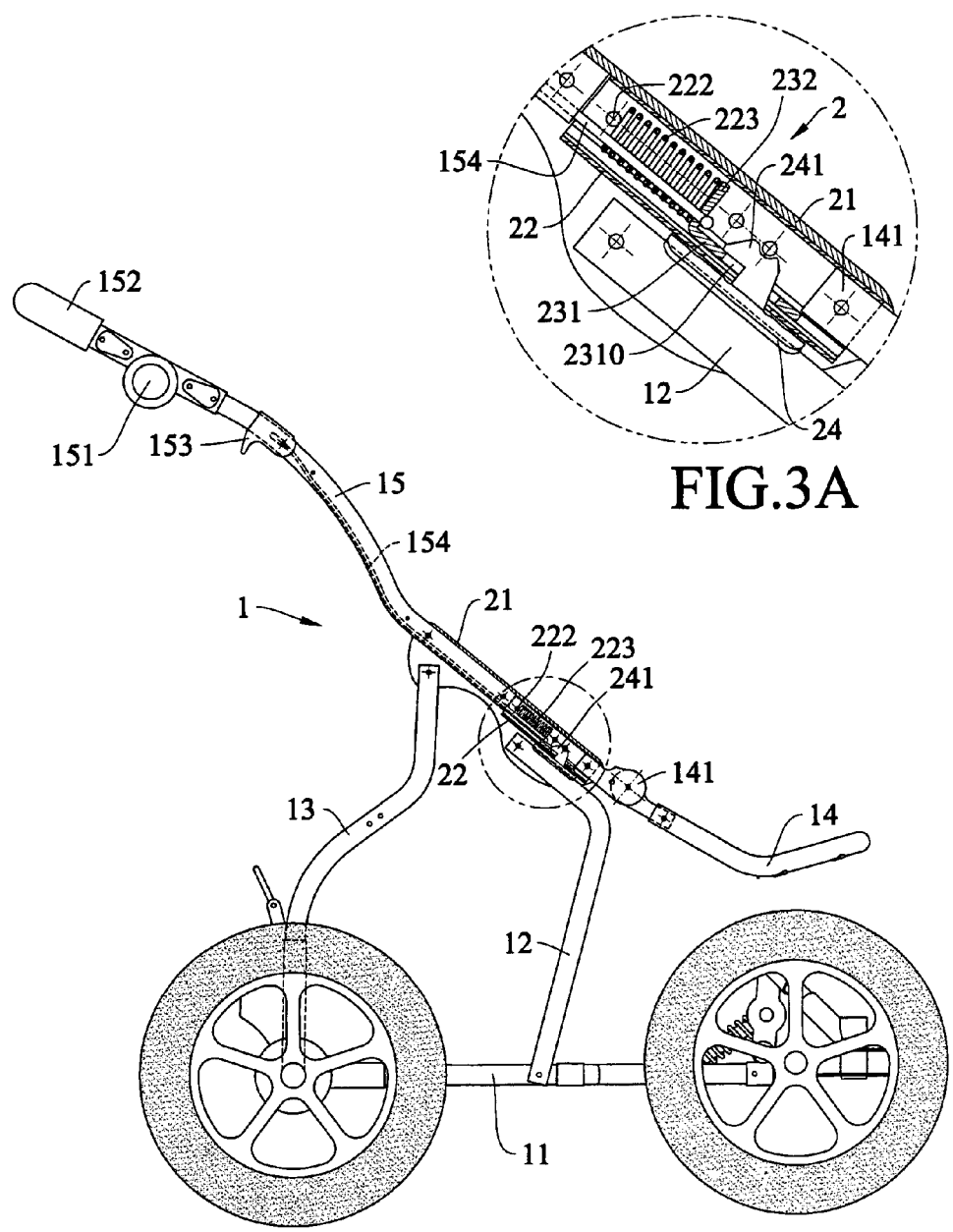
FIG. 3 is a side plan partially cross-sectional view of the stroller as shown in FIG. 1.
FIG. 3A is a partially enlarged view of the stroller as shown in FIG. 3.
Figure 4:
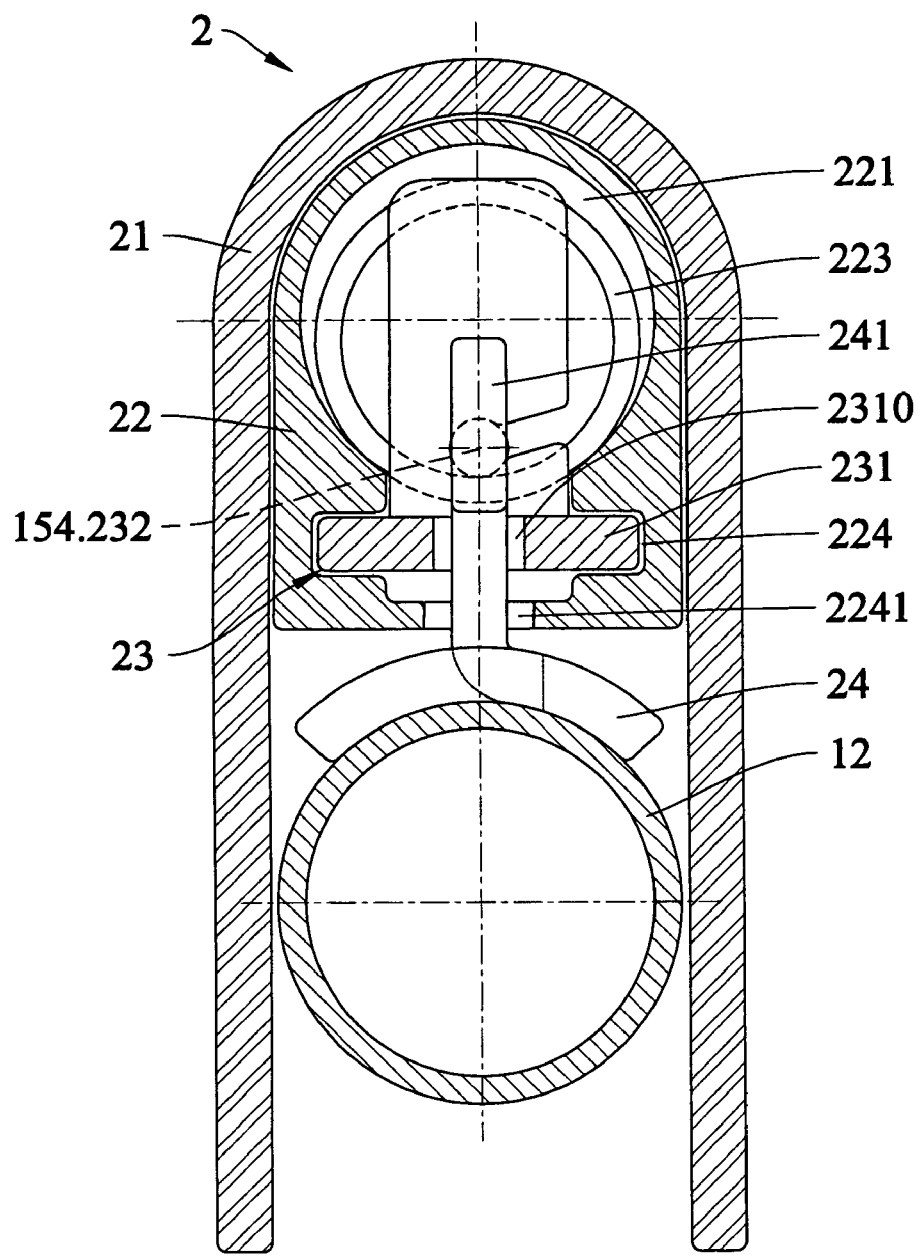
FIG. 4 is a plan cross-sectional view of the stroller as shown in FIG. 1.

Referring to the drawings and initially to FIGS. 1–4, a stroller 1 in accordance with the preferred embodiment of the present invention comprises a bottom frame 11, a support frame 12 having a lower portion pivotally mounted on a mediate portion of the bottom frame 11, a rear frame 13 having a lower portion pivotally mounted on a rear portion of the bottom frame 11, two opposite folding devices 2 each pivotally mounted on an upper portion of the support frame 12 and an upper portion of the rear frame 13, a footrest frame 14 pivotally mounted on a lower portion of each of the folding devices 2 by two opposite joints 141, a front frame 15 having a lower portion mounted on an upper portion of each of the folding devices 2, a push bar 152 pivotally mounted on an upper portion of the front frame 15 by two opposite joints 111, two pull blocks 153 each movably mounted on the upper portion of the front fame 15 and each located below the respective joint 151, and two pull cords 154 (see FIG. 3) each mounted in the front frame 15 and each having an upper end secured on the respective pull block 153 to move therewith.

Each of the folding devices 2 is mounted between the footrest frame and the front frame 15, and includes a main body 21, a socket 22, a slide plate 23, and a locking plate 24.

The main body 21 has a saddle shape and has an upper section secured on the lower portion of the front frame 15.

The main body 21 has a periphery pivotally mounted on the upper portion of the support frame 12 and the upper portion of the rear frame 13.

The socket 22 is secured in a lower section of the main body 21 and has an inside formed with a receiving chamber 221. Each of the folding devices 2 further includes a fixing rod 222 (see FIG. 3A) extended through the lower section of the main body 21 and an upper end of the receiving chamber 221 of the socket 22, so that the socket 22 is secured in the lower section of the main body 21. Each of the two opposite joints 141 of the footrest frame 14 is mounted in a lower end of the receiving chamber 221 of the socket 22 of the respective folding device 2. In addition, the receiving chamber 221 of the socket 22 has a wall formed with slideway 224. The slideway 224 of the receiving chamber 221 of the socket 22 has a bottom formed with a rectangular opening 2241.

The slide plate 23 is movably mounted in the receiving chamber 221 of the socket 22. The slide plate 23 is substantially L-shaped and has a first section 232 secured on a lower end of the respective pull cord 154 to move therewith and a second section 231 slidably mounted in the slideway 224 of the receiving chamber 221 of the socket 22. The first section 232 of the slide plate 23 is formed with a fixing hole 2320 for fixing the lower end of the respective pull cord 154. The second section 231 of the slide plate 23 is formed with a rectangular locking slot 2310 aligning with the opening 2241 of the slideway 224 of the socket 22.

The locking plate 24 having an arc-shaped cross-section is secured on the upper portion of the support frame 12 and is formed with a protruding locking hook 241 extended through the opening 2241 of the slideway 224 of the socket 22 and detachably locked in the locking slot 2310 of the second section 231 of the slide plate 23, so that each of the folding devices 2 is fixed on the upper portion of the support frame 12 by the slide plate 23 combining with the locking plate 24.

Each of the folding devices 2 further includes an elastic member 223 mounted in the receiving chamber 221 of the socket 22 and urged on the slide plate 23 for pressing the slide plate 23 toward the locking hook 241 of the locking plate 24, so that the locking hook 241 of the locking plate 24 is closely locked in the locking slot 2310 of the second section 231 of the slide plate 23. Preferably, the elastic member 223 has a first end urged on the fixing rod 222 and a second end urged on the first section 232 of the slide plate 23.

Figures 5, 5A:
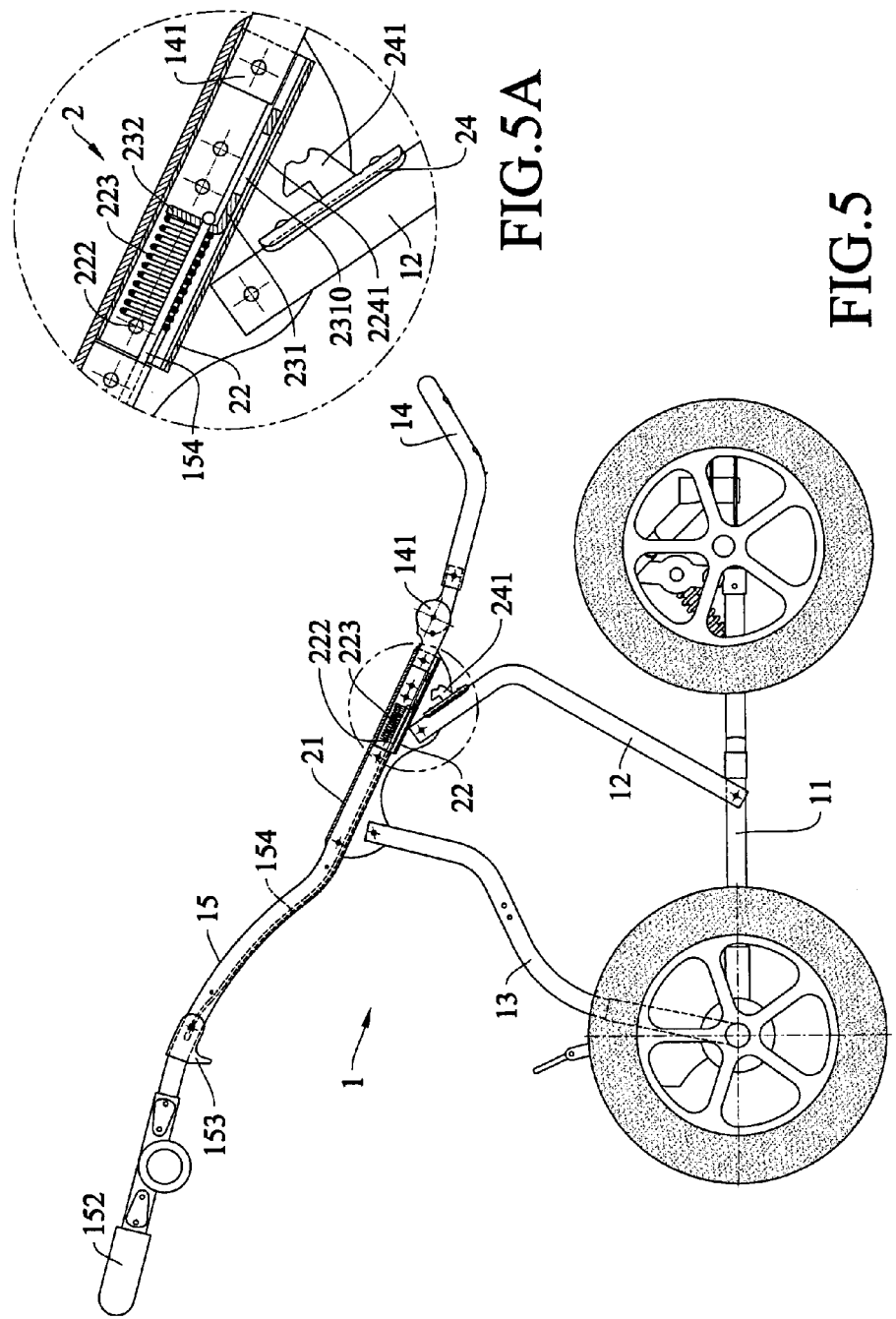
FIG. 5 is a schematic operational view of the stroller as shown in FIG. 3.
FIG. 5A is a schematic operational view of the stroller as shown in FIG. 3A.
Figure 6:
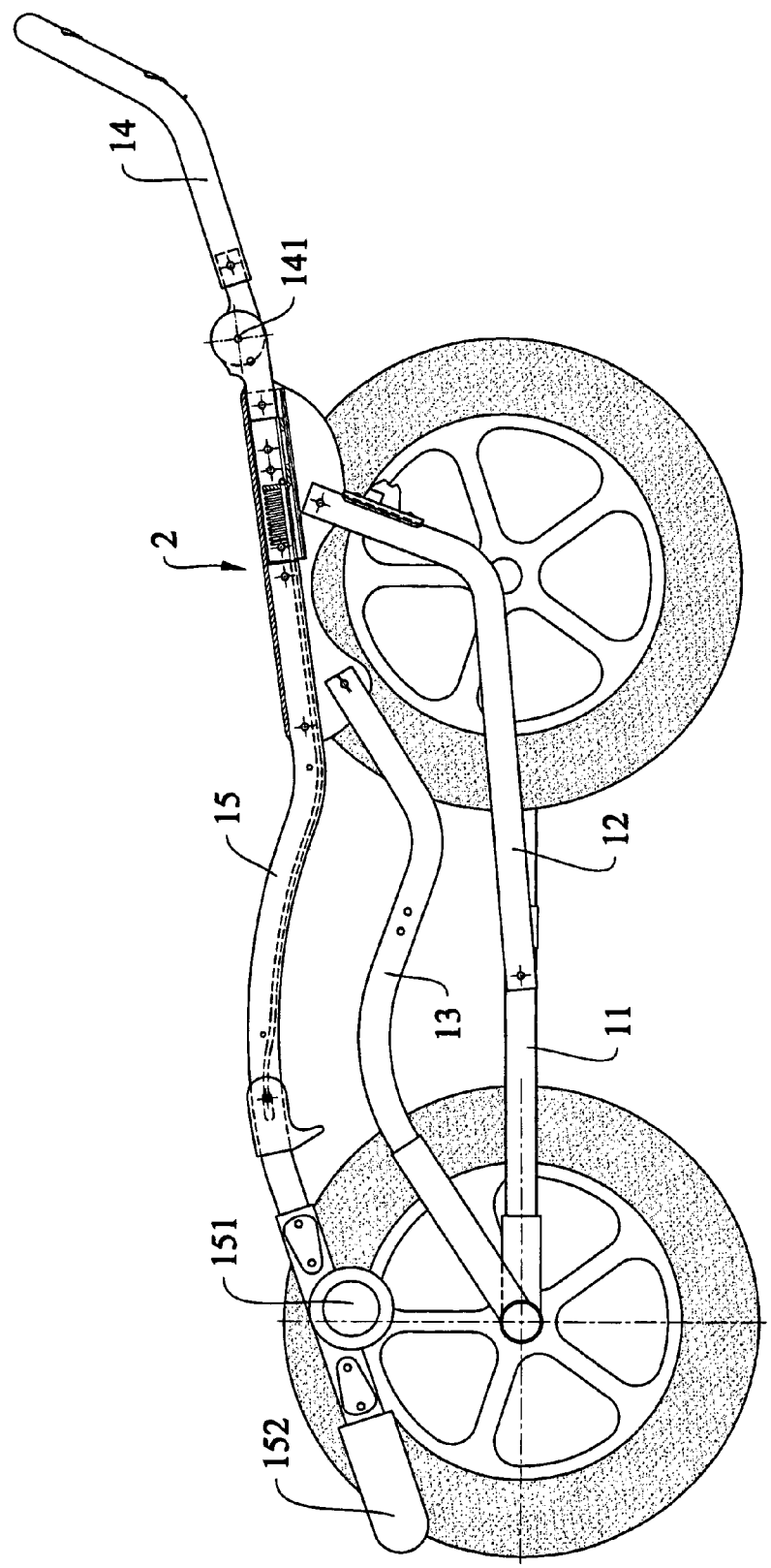
FIG. 6 is a schematic operational view of the stroller as shown in FIG. 5.
Figure 7:
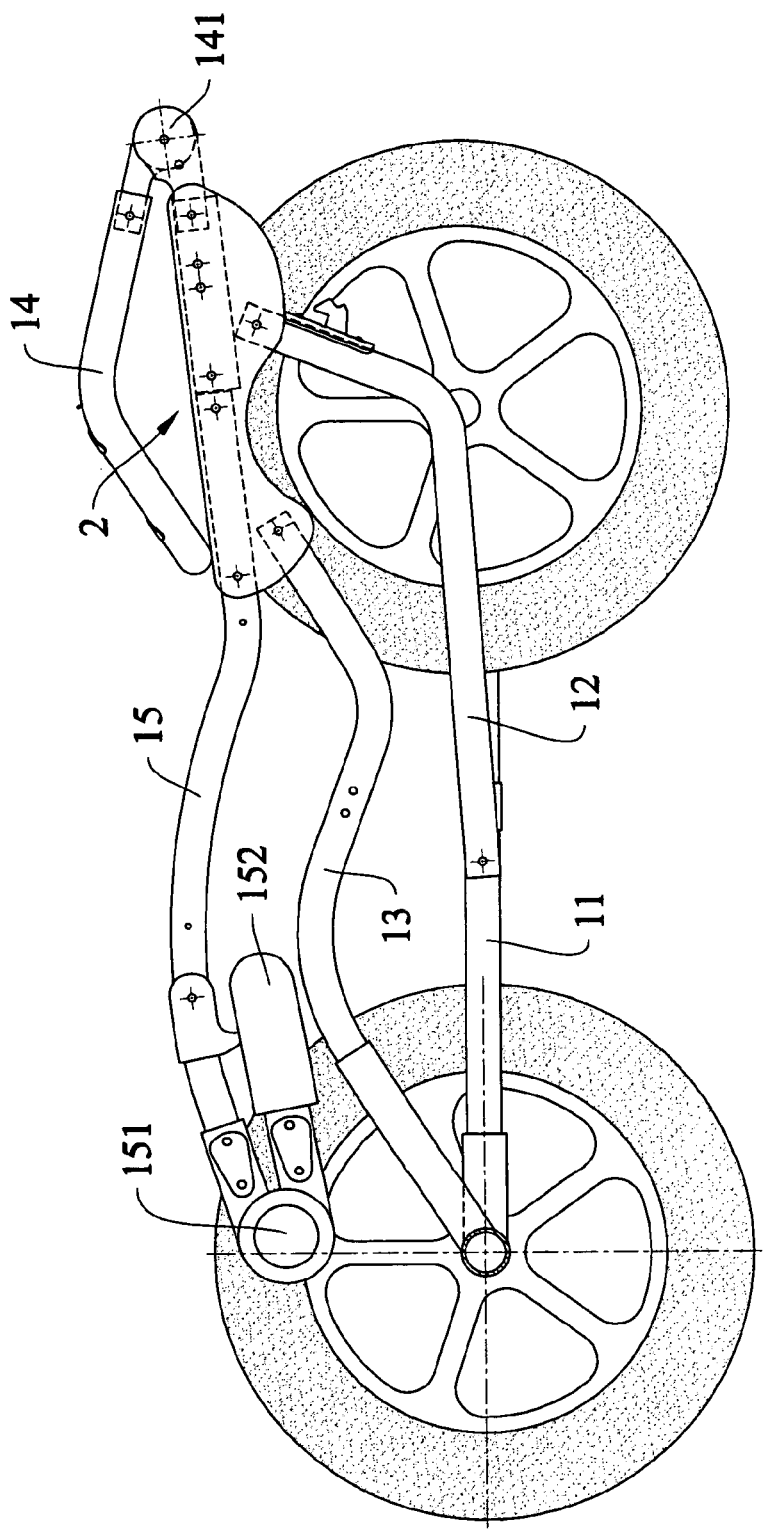
FIG. 7 is a schematic operational view of the stroller as shown in FIG. 6.

In operation, referring to FIGS. 1–7, each of the two pull blocks 153 is pulled upward to move on the upper portion of the front frame 15 to pull each of the two pull cords 154 upward to drive the slide plate 23 of each of the folding devices 2 to move outward relative to the locking hook 241 of the locking plate 24, thereby detaching the locking hook 241 of the locking plate 24 from the locking slot 2310 of the second section 231 of the slide plate 23, so that the locking plate 24 is detached from the slide plate 23, and each of the folding devices 2 is pivoted relative to the upper portion of the support frame 12 as shown in FIGS. 5 and 5A. Then, the front frame 15 is pressed downward to force the support frame 12 and the rear frame 13 to pivot forward until the front frame 15, the support frame 12 and the rear frame 13 are juxtaposed to each other and are rested on the bottom frame 11 as shown in FIG. 6. Finally, the footrest frame 14 is folded by pivoting the two opposite joints 141, and the push bar 152 is folded by pivoting the two opposite joints 111, thereby folding the stroller 1 as shown in FIG. 7.

Accordingly, the stroller 1 can be extended and folded easily and conveniently, thereby facilitating the user utilizing and folding the stroller 1. In addition, the stroller 1 can be folded efficiently so as to reduce the volume of the stroller 1 to the minimum value, thereby facilitating package, storage and transportation of the stroller 1. Further, the stroller 1 has a simplified structure, thereby decreasing costs of fabrication.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A stroller, comprising:
   a bottom frame;
   a support frame having a lower portion pivotally mounted on a mediate portion of the bottom frame;
   a rear frame having a lower portion pivotally mounted on a rear portion of the bottom frame;
   two opposite folding devices each pivotally mounted on an upper portion of the support frame and an upper portion of the rear frame;
   a front frame having a lower portion mounted on an upper portion of each of the folding devices;
   two pull blocks each movably mounted on the upper portion of the front frame;
   two pull cords each mounted in the front frame and each having an upper end secured on the respective pull block to move therewith;
   each of the folding devices including a main body, a socket, a slide plate, and a locking plate, wherein:
   the main body has a periphery pivotally mounted on the upper portion of the support frame and the upper portion of the rear frame;
   the socket is secured in a lower section of the main body and has an inside formed with a receiving chamber having a wall formed with slideway having a bottom formed with a rectangular opening;
   the slide plate is movably mounted in the receiving chamber of the socket and has a first section secured on a lower end of the respective pull cord to move therewith and a second section slidably mounted in the slideway of the receiving chamber of the socket, the second section of the slide plate is formed with a locking slot aligning with the opening of the slideway of the socket; and
   the locking plate is secured on the upper portion of the support frame and is formed with a protruding locking hook extended through the opening of the slideway of the socket and detachably locked in the locking slot of the second section of the slide plate, so that each of the folding devices is fixed on the upper portion of the support frame by the slide plate combining with the locking plate.

2. The stroller in accordance with claim 1, wherein the main body has a saddle shape.

3. The stroller in accordance with claim 1, wherein the slide plate is substantially L-shaped.

4. The stroller in accordance with claim 1, wherein the first section of the slide plate is formed with a fixing hole for fixing the lower end of the respective pull cord.

5. The stroller in accordance with claim 1, wherein the locking plate has an arc-shaped cross-section.

6. The stroller in accordance with claim 1, wherein the main body has an upper section secured on the lower portion of the front frame.

7. The stroller in accordance with claim 1, wherein each of the folding devices further includes a fixing rod extended through the lower section of the main body and an upper end of the receiving chamber of the socket, so that the socket is secured in the lower section of the main body.

8. The stroller in accordance with claim 1, wherein each of the folding devices further includes an elastic member mounted in the receiving chamber of the socket and urged on the slide plate for pressing the slide plate toward the locking hook of the locking plate, so that the locking hook of the locking plate is locked in the locking slot of the second section of the slide plate.

9. The stroller in accordance with claim 8, wherein each of the folding devices further includes a fixing rod mounted in an upper end of the receiving chamber of the socket, and the elastic member has a first end urged on the fixing rod and a second end urged on the first section of the slide plate.

10. The stroller in accordance with claim 1, further comprising a footrest frame pivotally mounted on a lower portion of each of the folding devices by two opposite joints.

11. The stroller in accordance with claim 10, wherein each of the two opposite joints of the footrest frame is mounted in a lower end of the receiving chamber of the socket of the respective folding device.

12. The stroller in accordance with claim 10, wherein each of the folding devices is mounted between the footrest frame and the front frame.

13. The stroller in accordance with claim 1, further comprising a push bar pivotally mounted on an upper portion of the front frame by two opposite joints.

14. The stroller in accordance with claim 1, wherein the locking slot of the slide plate has a rectangular shape.

15. The stroller in accordance with claim 1, wherein the opening of the slideway of the socket has a rectangular shape.

* * * * *